United States Patent
Weum

(10) Patent No.: US 8,800,402 B2
(45) Date of Patent: Aug. 12, 2014

(54) MOTOR MECHANISM

(75) Inventor: Dag Trygve Weum, Moss (NO)

(73) Assignee: VingCard Elsafe AS, Moss (NO)

( * ) Notice: Subject to any disclaimer, the term of this patent is extended or adjusted under 35 U.S.C. 154(b) by 520 days.

(21) Appl. No.: 13/040,124

(22) Filed: Mar. 3, 2011

(65) Prior Publication Data

US 2011/0215597 A1    Sep. 8, 2011

Related U.S. Application Data

(60) Provisional application No. 61/310,644, filed on Mar. 4, 2010.

(51) Int. Cl.
 *F16H 1/24* (2006.01)
 *F16H 55/02* (2006.01)
 *E05B 51/00* (2006.01)

(52) U.S. Cl.
 USPC .................. 74/424.79; 74/424.78; 70/275

(58) Field of Classification Search
 USPC ............... 74/424.71, 424.78, 424.79, 89.37, 74/89.38, 89.39; 192/56.1; 70/275
 See application file for complete search history.

(56) References Cited

U.S. PATENT DOCUMENTS

| | | | |
|---|---|---|---|
| 844,469 A * | 2/1907 | Prouty | 74/424.79 |
| 2,030,637 A * | 2/1936 | Jeffrey | 74/424.79 |
| 2,090,330 A * | 8/1937 | Jones | 74/841 |
| 3,815,434 A * | 6/1974 | Seger | 74/424.79 |
| 4,519,640 A | 5/1985 | Mombelli | |
| 5,037,145 A | 8/1991 | Wilkes | |
| 5,125,280 A | 6/1992 | Koscinski et al. | |
| 5,128,688 A | 7/1992 | West | |
| 5,461,935 A * | 10/1995 | Hill | 74/89.38 |
| 5,472,065 A | 12/1995 | Vergin | |
| 5,473,922 A | 12/1995 | Bair et al. | |
| 5,704,249 A * | 1/1998 | Krauska | 74/89.38 |
| 5,826,377 A | 10/1998 | Simson et al. | |
| 5,832,779 A | 11/1998 | Madrid et al. | |
| 5,868,226 A | 2/1999 | Vranish | |
| 5,913,458 A | 6/1999 | Eriksson | |
| 6,094,952 A | 8/2000 | Clark et al. | |
| 6,406,390 B1 | 6/2002 | Roby | |
| 6,854,620 B2 | 2/2005 | Ramey | |
| 7,052,054 B2 | 5/2006 | Luker | |
| 7,066,045 B2 | 6/2006 | Krause | |
| 7,390,314 B2 | 6/2008 | Stutz, Jr. et al. | |
| 2001/0005998 A1 | 7/2001 | Imedio Ocana | |
| 2001/0055947 A1 | 12/2001 | McCabe | |
| 2002/0155909 A1 | 10/2002 | Roby | |
| 2005/0086984 A1 | 4/2005 | Errani et al. | |

(Continued)

FOREIGN PATENT DOCUMENTS

DE    4039411    6/1992
DE    19604644    8/1997

(Continued)

*Primary Examiner* — Justin Krause
(74) *Attorney, Agent, or Firm* — Sheridan Ross P.C.

(57) ABSTRACT

In one use, a motor mechanism for an electronic lock is disclosed. In one embodiment, the motor mechanism includes a split nut that travels along a threaded screw drive. When the split nut is physically limited from further travel along the screw drive, the split nut decouples and recouples with the screw drive to reduce drag on the motor and thereby reduce motor burnout. As a result, smaller, more cost effective and efficient electric motors may be utilized together with simplified electronics.

19 Claims, 15 Drawing Sheets

(56) References Cited

U.S. PATENT DOCUMENTS

| | | |
|---|---|---|
| 2005/0191153 A1 | 9/2005 | McIntyre et al. |
| 2005/0199024 A1 | 9/2005 | Wirths |
| 2010/0011822 A1 | 1/2010 | Imedio Ocana |

FOREIGN PATENT DOCUMENTS

| | | |
|---|---|---|
| DE | 20215721 | 1/2003 |
| EP | 0905390 | 3/1999 |
| EP | 1068093 | 1/2001 |
| EP | 1672149 | 6/2006 |
| FR | 2653480 | 4/1991 |
| FR | 2660963 | 10/1991 |
| FR | 2816977 | 5/2002 |
| GB | 612462 | 11/1948 |
| GB | 2287277 | 9/1995 |
| GB | 2320943 | 7/1998 |
| GB | 2362937 | 12/2001 |
| JP | 02-273007 | 11/1990 |
| JP | 04-151013 | 5/1992 |
| JP | 09-257532 | 10/1997 |
| JP | 11-082458 | 3/1999 |
| JP | 2007-162790 | 6/2007 |
| WO | WO 90/10774 | 9/1990 |
| WO | WO 97/30254 | 8/1997 |
| WO | WO 2005/078317 | 8/2005 |
| WO | WO 2008/133574 | 11/2008 |
| WO | WO 2009/045714 | 4/2009 |

* cited by examiner

MOTOR MECHANISM

CROSS-REFERENCE TO RELATED APPLICATION

This application claims the benefit of U.S. Provisional Application No. 61/310,644, filed Mar. 4, 2010, the entire disclosure of which is hereby incorporated herein by reference.

FIELD OF THE INVENTION

Electronically controlled locks for use in access control are becoming more popular. For example, an increasing number of locking systems permit users to lock and unlock a door by way of an electronic lock rather than with a traditional key. The motor mechanism described herein has application in access control environments in association with not only door locks but also in connection with other types of access control locks, as well as in situations involving linear movement of a coupling.

BACKGROUND OF THE INVENTION

In one embodiment of an electronic lock, an electric motor rotates a threaded driver or screw to move a follower along the screw in a direction dependent upon the rotational direction of the screw. The follower is typically interconnected to a coupling member such as a clutch head. As the follower moves along the screw away from the motor, the coupling member engages a corresponding or compatibly shaped second coupling member that is interconnected to the bolt or latch mechanism of the lock. Engagement of the coupling member causes rotation of a door knob to open a door. Reversing the direction of rotation of the screw moves the follower and interconnected first coupling member away from the second coupling member, thereby disengaging the two coupling members. Once disengaged, rotation of the door knob cannot actuate the bolt or latching mechanism and open the door.

Alternatively, as is known to those skilled in the art, the door knob may be permanently interconnected to the bolt or latching mechanism, but a blocking mechanism prevents rotation of the knob and opening of the door. In this type of system, the electric motor and follower control position of the blocking mechanism. Moving the follower in one direction along the screw moves the blocking mechanism into a blocking position and moving the follower in the opposite direction removes the blocking mechanism from the blocking position which allows rotation of the door knob to open the door.

One problem with these types of mechanisms is that the follower may become stuck to an opposing surface at one or both ends of the screw as it traverses back and forth along the screw. For example, the housing of the electric motor is positioned at one end of the screw. When the follower physically moves to the end of the screw closest the motor housing, it may abut the housing or surrounding structure. Continued driving of the electric motor and rotation of the screw causes the follower to rotate and press against the surface of the housing or the surrounding structure. This creates an increasing loading force which, in turn, creates stiction between the follower and the abutting surface of the housing or surrounding structure. When called upon to reverse direction and move the follower in the opposite direction along the screw, the electric motor may be insufficiently powered or unable to provide adequate torque to free the follower from the abutting surface due to the created stiction. It should be appreciated that this problem can occur at the opposite end of the screw or anywhere along the range of travel of the follower where the follower abuts a physical restraint to its travel. For example, a surrounding structure in the form of an enclosure or housing of the lock assembly may also give rise to this problem.

One solution to this problem is to utilize a more powerful electric motor to overcome the stiction. However, this solution increases cost, may increase the physical size of the motor, and potentially does not solve the problem, as a more powerful motor may simply recreate the same issue. A further problem is that continued rotation of the electric motor once the follower has engaged a physical stop can reduce the life of the electric motor or burn out the motor. Thus, if the follower is abutting an immovable surface and the electric motor, continues to run, the motor may overheat, incur damage or burn itself out.

This latter problem has been addressed by adding sensors within the lock housing to sense the position of the follower at opposite ends of its travel along the screw. Thus, a sensor can signal the electric motor to cease operation and stop rotating the screw before or once the follower contacts an abutting surface within the lock assembly. The sensors, such as micro switches, infrared sensors or read switches, send a signal back to the motor electronics to start or stop the motor. Examples of electronic locks that utilize sensors are models WCL-7000 and WCL-7300 sold by WaferLock of Taiwan. This prevents over rotation and resulting stiction and also prevents motor burnout. However, inclusion of sensors adds to the cost, complexity and size of the system.

Sensors may also fail when exposed to humidity or bad climate conditions. These locks can be installed in a wide variety of situations with significantly varying environmental conditions from extremely cold to extremely hot, extremely dry to extremely humid, and combinations of these conditions.

There are electronic lock mechanisms that do not rely upon sensors or movement of a follower along a threaded screw. One example is a blocking mechanism model no. 4206, sold by VingCard/Elsafe of Norway. In this device, an electric motor rotates a screw to bend a "U" or "V" shaped spring-like device coupled to the screw. The legs of the spring-like device are interconnected to a movable locking plate. Depending upon the direction of rotation of the screw, bending of the spring member extends or retracts a locking plate to engage with or disengage from the locking mechanism for the door. This mechanism is dependent upon the quality of the spring member and the tolerance between the screw and the spring member.

SUMMARY OF THE INVENTION

In at least one embodiment, a motor mechanism is provided for use in an electronic lock assembly. An electric motor is interconnected with and rotatably drives a threaded member, such as a screw drive. A carriage assembly is operatively interconnected to the threaded member and advances along the threaded member in one direction or the opposite direction depending upon the direction of rotation of the threaded member. The carriage assembly comprises a split nut having two or more component members, at least one of which has an inner threaded surface to engage or couple with the threaded surface of the threaded member. At least one biasing member holds the two or more components of the split nut in a coupled relationship with the threaded member. The carriage assembly further comprises a pair of spaced annular members. One annular member is positioned proximate one end of the split nut and the second annular member is positioned proximate the opposite end of the split nut. The threaded member extends through the opening in each annular member. At least one guide slot extends between the annular members and positions the annular members in a spaced relationship. The split nut includes at least one outwardly extending guide block which is positioned within the at least one guide slot to prevent the split nut from rotating as it travels along the threaded member. A coupling is interconnected to one of the annular members by a resilient member, such as a spring. In one embodiment, the coupling is a male clutch member designed and shaped to engage with and disengage from a complementary shaped coupling member. The complementary coupling receiving member is interconnected to a latch mechanism that opens a door. In an alternative embodiment, the complementary coupling member may comprise a blocking mechanism of a lock assembly or the coupling member may comprise a blocking mechanism.

In one embodiment, the motor mechanism is designed to fit within a lock cylinder or lock body and is electrically connected to other electronic components in a knob or handle. The components in the knob or handle interface with discrete devices, such as access cards, smart phones or other devices, which contain access codes or permission and communicate wirelessly with the components in the knob or handle to provide or deny access to a person or object associated with a device containing the access codes and/or permissions. Alternatively, the electronics in the knob or handle may include a user interface involving push buttons, fingerprint scanners or other biometrics.

In operation, and assuming the carriage assembly is positioned at one-end of the threaded member, initial rotation of the threaded member by the electronic motor will cause the split nut to move along the threaded member while the pair of annular members remains stationary. After some distance of travel, the split nut will physically contact one of the annular members, depending upon the direction of movement. Continued rotation of the threaded member will cause the entire carriage assembly to move along the threaded member. Typically, in embodiments of the invention, movement of the carriage assembly extends the coupling into engagement with the complementary coupling member, retracts and disengages the coupling from the complementary coupling member, or moves the blocking member into and out of a locking position, depending upon the direction of travel of the carriage assembly. To the extent that the complementary coupling member is oriented in a position that prevents receiving or releasing the coupling, the resilient member interconnecting the coupling with the carriage assembly stores energy until proper orientation between the coupling and complementary coupling member is achieved. If the coupling is moving to an extended position, upon proper orientation the resilient member will force the coupling into engagement with the complementary coupling member. In the context of a latching mechanism, a person may now rotate the knob or handle and open the door. In the context of a blocking mechanism, the door knob or handle will not rotate and access is denied. If the coupling is moving to a retracted position, upon proper orientation, the resilient member will force the coupling out of engagement with the complementary coupling member. In the context of a latching mechanism, the knob or handle will freely rotate without opening of the door. In the context of a blocking mechanism, the previously locked knob or handle will now be able to rotate and the door may be opened.

In at least one embodiment, physical stops are positioned relative to the carriage assembly to stop its movement along the threaded member. One stop defines the fully retracted or disengaged position of the coupling and one stop defines the fully extended or engaged position of the coupling. When the carriage assembly engages a physical stop and can travel no further along the threaded member, continued rotation of the threaded member will cause the split nut component members to separate and move radially outwardly under the force created by the threaded coupling between the threaded member and the threaded portions of the split nut component pieces. In a preferred embodiment, the force applied on the threads of the split nut by the angle of threads on the threaded member are generally equal in the direction of travel along the threaded member and in a direction radially outwardly from the threaded member. Because the split nut component pieces are held together by at least one biasing member, continued rotation of the threaded member coupled with the inwardly directed force of the at least one biasing member causes the components of the split nut to repeatedly re-couple with the threaded member as long as the threaded member continues to rotate. Thus, as the threaded member continues to rotate, the split nut cyclically moves out of engagement and into engagement with the threaded member until rotation of the threaded member ceases. In one embodiment, the angle of the threads of the threaded member is between 80° and 100°, and preferably are 90°. Thus, even though the carriage assembly contacts a physical stop preventing further movement of the carriage assembly along the threaded member, little or no stiction is created between the contacting surfaces. Rather, the components comprising the split nut move radially outwardly and inwardly until rotation of the threaded member ceases.

Because of the split nut and carriage assembly of embodiments of the present invention, the motor mechanism may utilize a motor having less torque and power output than previously required. This is due to the fact that the motor is not initially required to move the entire carriage assembly. Instead, the motor initially is required to only advance the split nut and, once the motor achieves a sufficient rotational speed and torque, the split nut engages an annular member and the entire carriage assembly is moved. In addition, because no stiction is created between contacting surfaces of the carriage assembly and the physical stops, a motor having less torque is required to reverse direction and move the carriage assembly away from contact with a physical stop. As a result, electronic and/or optical sensors and related electronic circuitry are not required to sense and monitor movement of the carriage assembly and thus may be eliminated. This greatly simplifies and reduces the cost, complexity and size of the motor mechanism.

Figure 1:
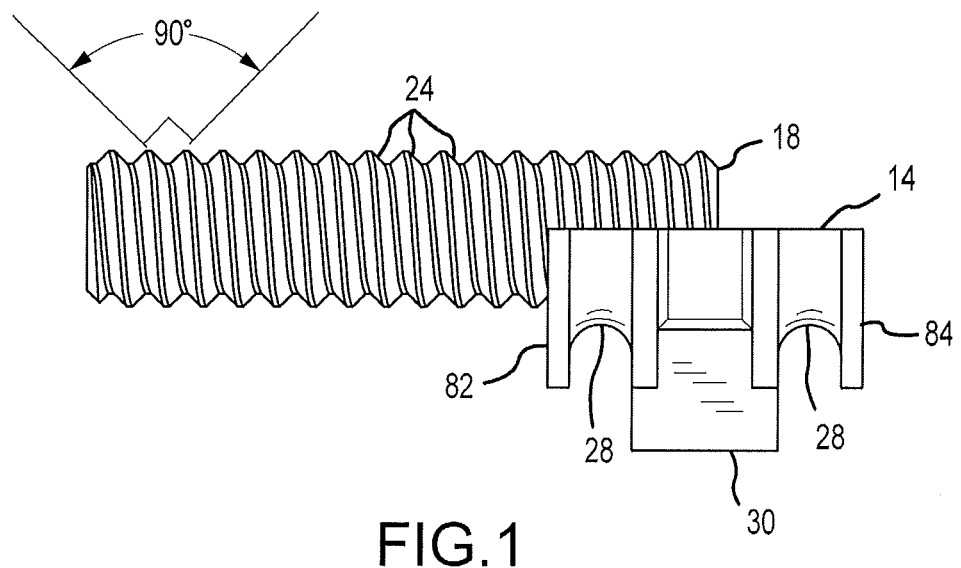
FIG. 1 is front plan view of one embodiment of a threaded screw drive and half nut.
Figure 2:
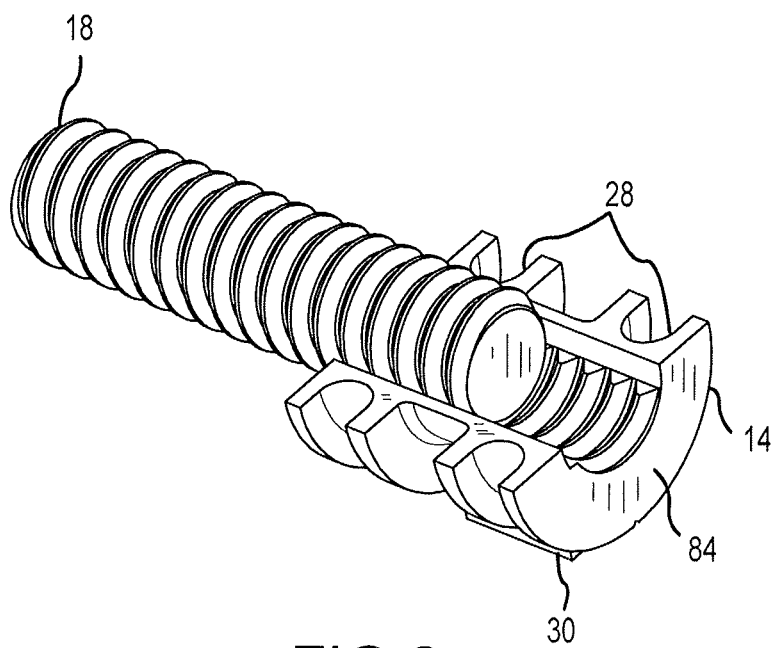
FIG. 2 is a perspective view of the device of FIG. 1.
Figure 3:
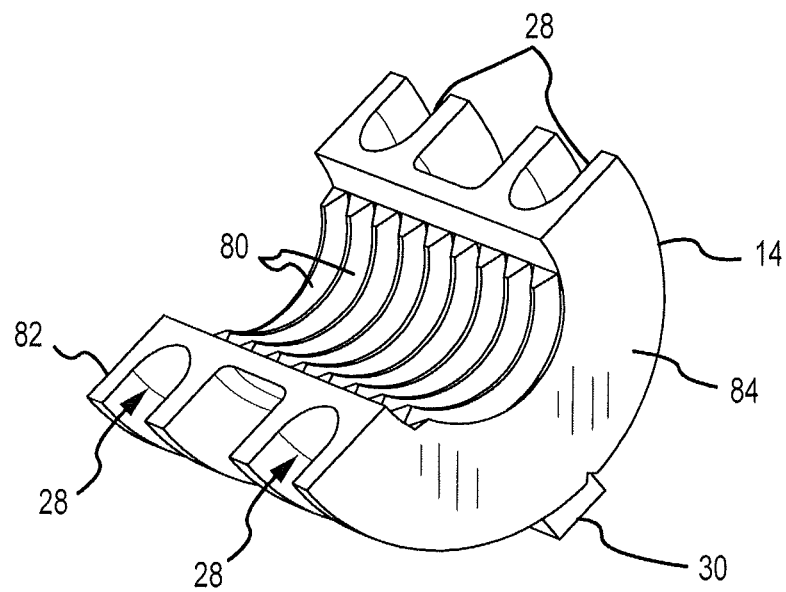
FIG. 3 is a perspective view of the half nut of FIG. 1.
Figure 4:
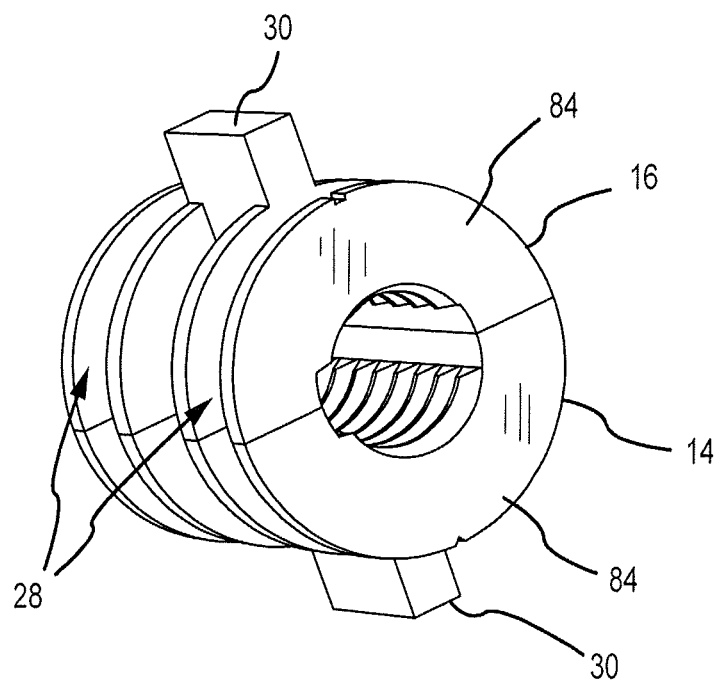
FIG. 4 is a perspective view of one embodiment of a split nut comprising two half nuts.
Figure 5:
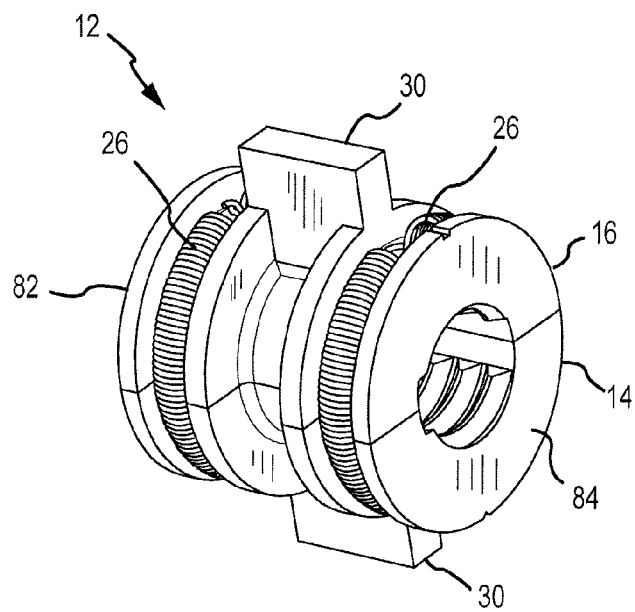
FIG. 5 is a perspective view of the split nuts of FIG. 4, further including biasing members positioning the half nuts in a contacting relationship.

It should be understood that the drawings are not necessarily to scale. In certain instances, details that are not necessary for an understanding of the invention or that render other details difficult to perceive may have been omitted from these drawings. It should be understood, of course, that the invention is not limited to the particular embodiments illustrated in the drawings.

DETAILED DESCRIPTION

One embodiment of a motor mechanism 10 of the present invention will now be described. With reference to FIGS. 1-5 and 11, a split nut assembly 12 is shown. As illustrated, the split nut 12 comprises two half nuts 14, 16 which threadably engage and interact with a drive screw 18 mounted on the output shaft 20 of an electric motor 22. While two half nuts 14, 16 are shown in the accompanying figures, it should be appreciated that the split nut assembly be made of two or more pieces but preferably no more than four. In addition, not all of the pieces comprising the nut assembly are required to threadably interact with the threads 24 of the screw, although all of the components may threadably couple to the screw threads. Biasing members 26, such as springs or elastomeric rings, are positioned in channels 28 formed on the exterior of the half nuts to hold the half nuts in threaded engagement with the threads 24 of the screw 18. In the embodiment illustrated, each of the half nuts 14, 16 further include an outwardly extending extension or guide block 30.

Figure 6:
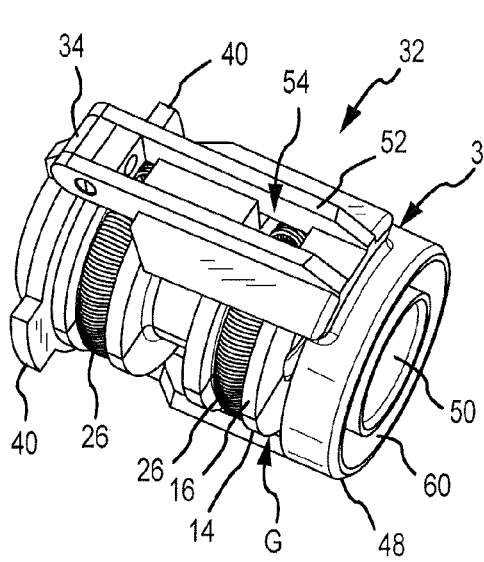
FIG. 6 is a perspective view of one embodiment of a carriage assembly showing the split nut of FIG. 4 positioned in contact with a spring snap holder.
Figure 7:
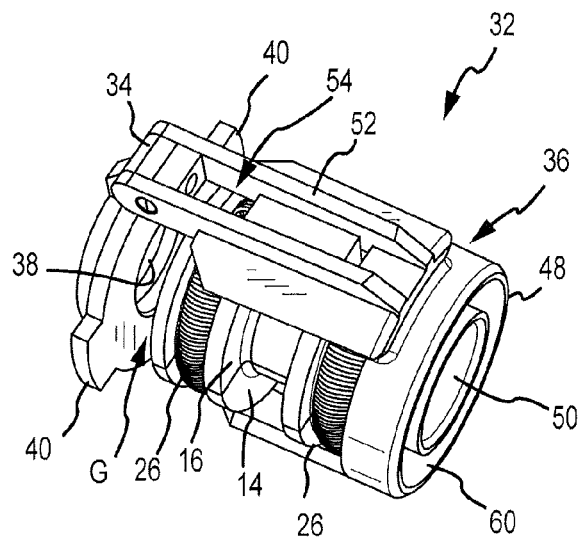
FIG. 7 is a perspective view of the carriage assembly of FIG. 6 with the split nut positioned in contact with the annular member of a nut translation follower.

Turning to FIGS. 6 and 7, a carriage assembly 32 is shown. The carriage assembly 32 comprises the split nut assembly 12, a spring snap holder 34, and a nut translation follower 36.

Figure 15:
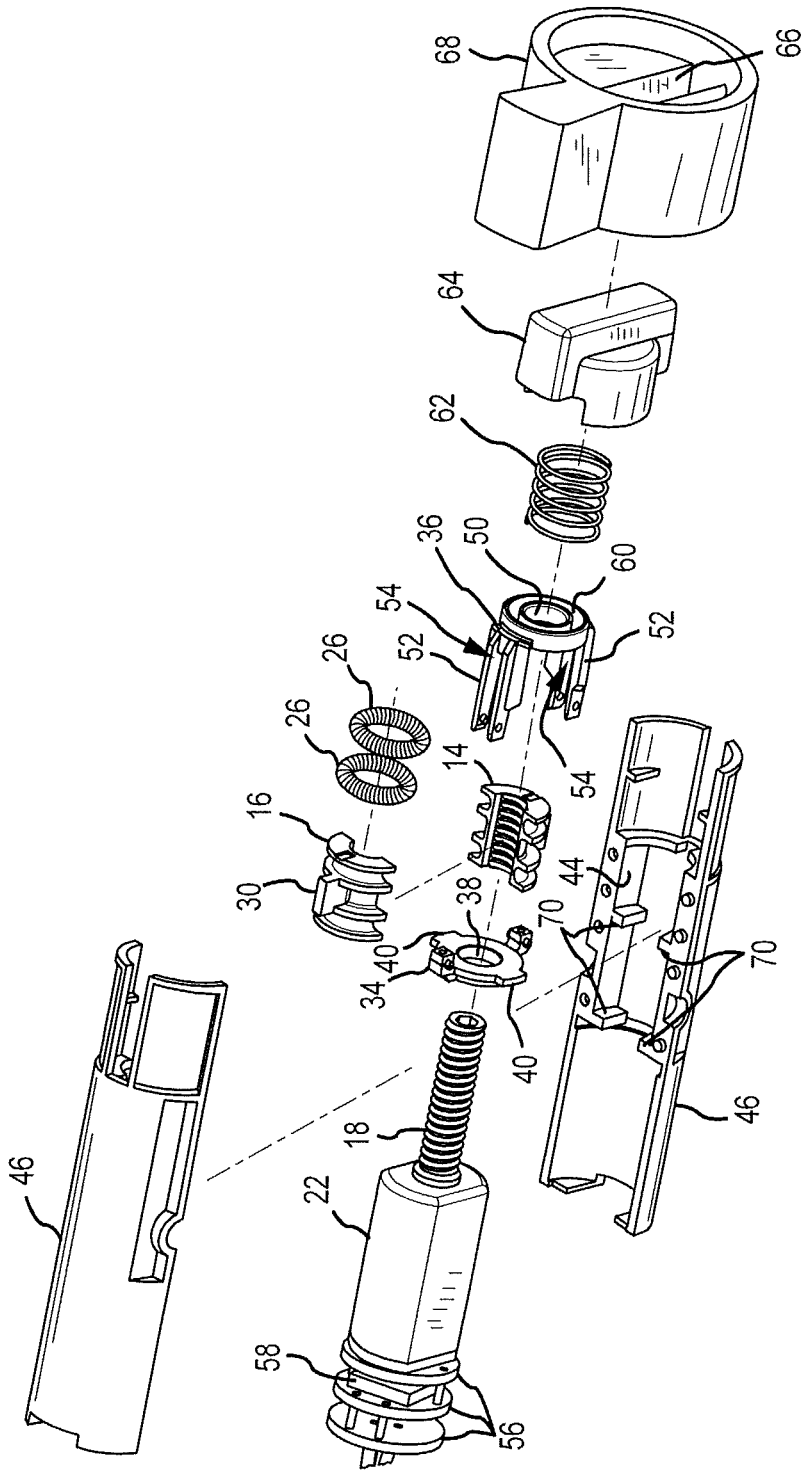
FIG. 15 in exploded view of one embodiment of the motor mechanism of the present invention.

The spring snap holder 34 is a generally annular-shaped piece with a central opening 38 larger than the diameter of the screw 18 through which the screw extends when the mechanism is assembled. A pair of flanges 40 extend outwardly from opposite sides of the spring snap holder 34. These flanges 40 travel within a channel 42 formed by the inner wall 44 of the housing 46 that encloses the carriage assembly 32 as illustrated in FIG. 15. The nut transition follower 36 comprises an annular member 48 with an opening 50 larger than the diameter of the screw 18 to permit the screw 18 to extend through the opening 50. A pair of opposed guide members 52 extend from the annular member 48 and engage the spring snap holder 34 to capture the half nuts 14, 16 in the space defined between the spring snap holder 34 and the nut translation follower 36. A pair of pins (not shown) couple the spring snap holder 34 to the nut translation follower 36. The half nuts 14, 16 are threadably coupled to the threads 24 of the screw 18. The outwardly extending guide blocks 30 on the half nuts 14, 16 are positioned in slots 54 formed by the guide members 52. By positioning the guide blocks 30 within the slots 54, the half nuts 14, 16 will not rotate when the screw 18 is rotating. Thus, the half nuts 14, 16 will move along the screw 18 away from or toward the motor 22 depending upon the direction of rotation of the screw 18.

Figure 8:
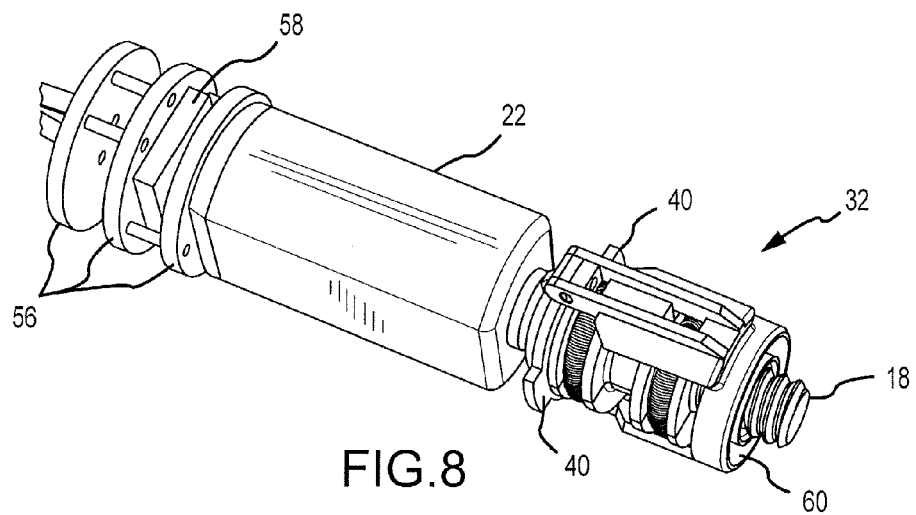
FIG. 8 is a perspective view of one embodiment of a carriage assembly of the present invention interconnected with an electric motor and a threaded screw drive.

Turning to FIG. 8, the carriage assembly 32 is assembled on a screw 18 associated with an electric motor 22. As previously noted, the screw 18 extends through the opening 38 in the spring snap holder 34 and through the opening 50 in the nut translation follower 36. Also illustrated are one or more printed circuit boards (PCBs) 56 and an integrated circuit chip 58 and other components (not shown) for controlling the electric motor 22.

Figure 9:
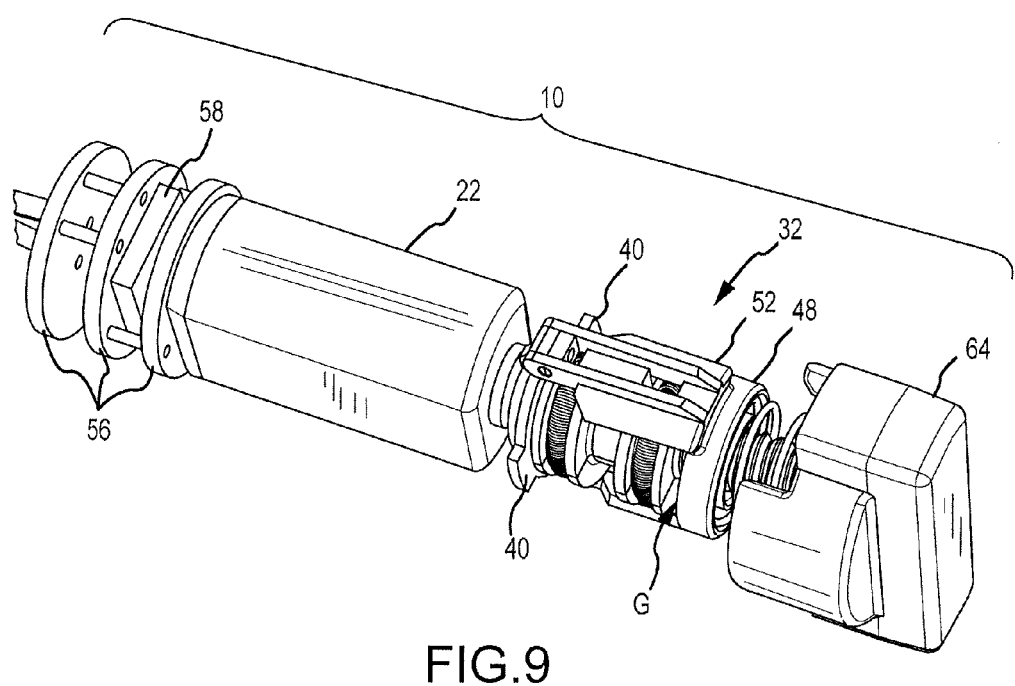
FIG. 9 is a perspective view of one embodiment of a motor mechanism of the present invention.
Figure 10:
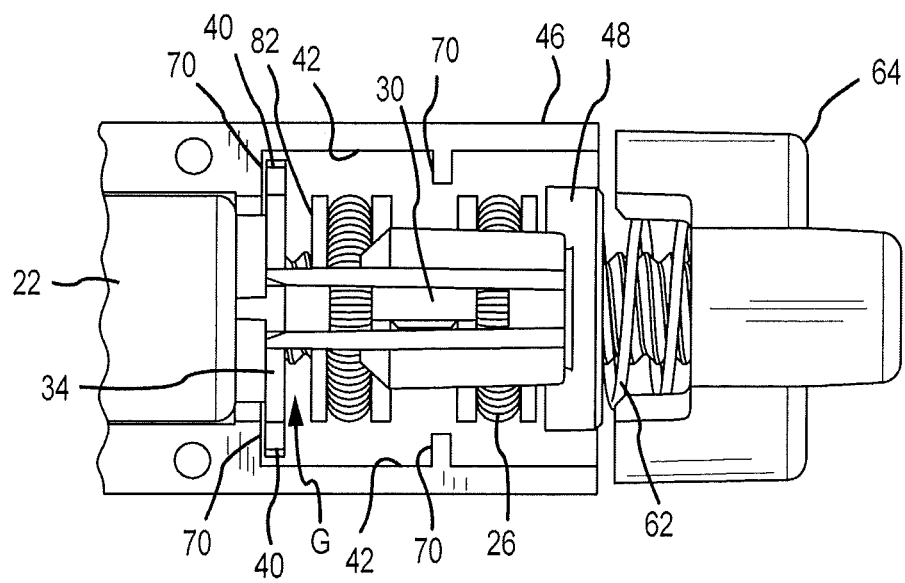
FIG. 10 is a partial top plan view of the motor mechanism of FIG. 9.
Figure 12:
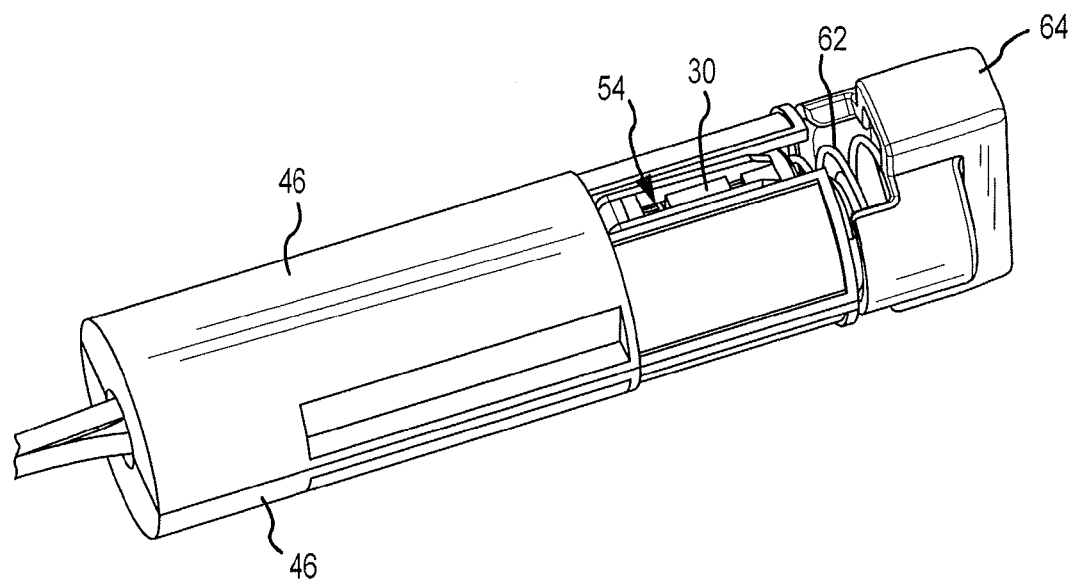
FIG. 12 is a perspective view of one embodiment of a motor mechanism of the present invention partially enclosed within a housing.

As shown in FIGS. 6-10, the annular member 46 of the nut translation follower 36 includes an annular groove or channel 60 to receive one end of a biasing member or spring 62. The opposite end of the spring 62 engages the interior of a male clutch head 64. In turn, the male clutch head is configured to fit within a corresponding slot 66 in a lever mechanism or DIN arm 68. As illustrated in FIGS. 12 and 15, these component pieces are enclosed within the housing 46. As shown in FIG. 10, the inner wall 44 of housing 46 may further form a channel 42 to receive and engage the guide members 40 of the spring snap holder 34. Abutment surfaces 70 are formed by the inner wall 44 of the housing 46 and interact with the flanges 40 extending outwardly from the spring snap holder 34 to provide physical stops for the travel of the carriage assembly 32 along the screw 18. Alternatively, the flanges 40 may be positioned on the annular member 48 of the nut translation follower 36 or on the split nut.

Figure 13A:
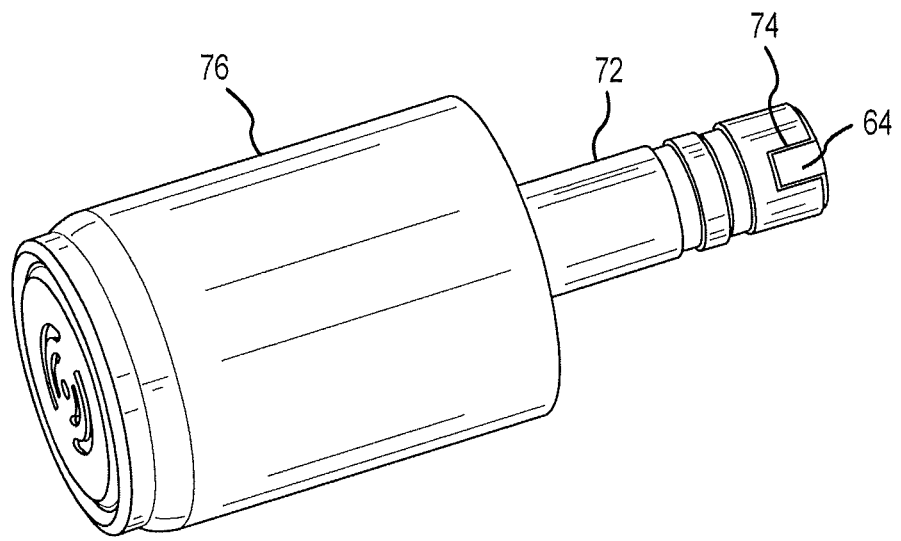
FIG. 13A is a perspective view of one embodiment of a motor mechanism of the present invention enclosed within a cylindrical sleeve and interconnected to an associated knob, further showing a male clutch head in a retracted position.
Figure 13B:
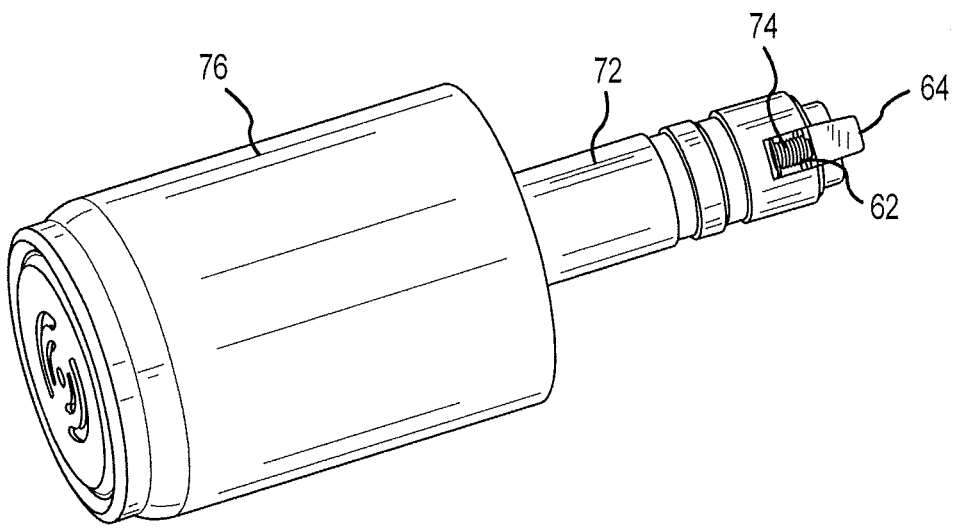
FIG. 13B is a perspective view of the embodiment of FIG. 13A, further showing the male clutch head in an extended position.
Figure 14:
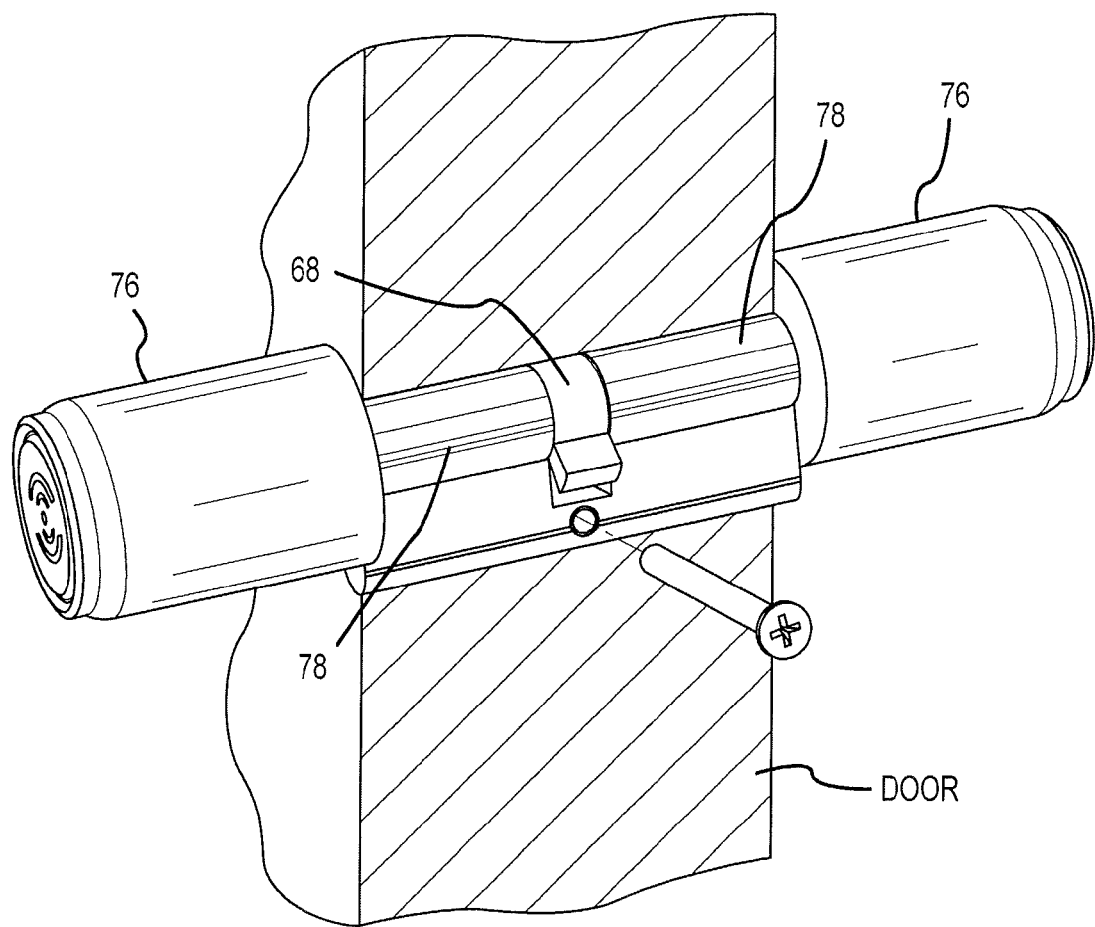
FIG. 14 is a perspective view of one embodiment of a knob and lock assembly affixed to a door (shown in cross-section).

The components shown in an exploded view in FIG. 15, are shown assembled in FIG. 12. The assembled mechanism of FIG. 12 is then placed in an inner metal cylinder 72 having a cutout 74 corresponding to the shape of the male clutch head 64. The metal cylinder 72 is interconnected with a knob or handle 76. When installed in a door, the metal cylinder 72 is positioned in a cylinder housing 78 containing the lever arm 68. FIG. 13A shows the clutch head 64 in a retracted or disengaged position. FIG. 13B shows the clutch head 64 in an extended or engaged position. Electronics are positioned within the knob 76 to interface or communicate with authorized users, such as persons with access control cards or other access devices (including cell phones, smart phones) which include authorized access codes, permissions or authorizations that activate the electronics associated with the motor mechanism 10. The external devices may communicate wirelessly with the electronics in the knob or handle, or the knob or handle may include an interface accepting user input such as a key pad or biometric scanner. It should be appreciated that the motor mechanism 10 may be provided with two knobs 76, as shown in FIG. 14, where either or both knobs include electronics to interface with devices in the possession of users with permission to unlock the lock, or the motor mechanism 10 may be used with a single knob assembly.

Figure 16A:
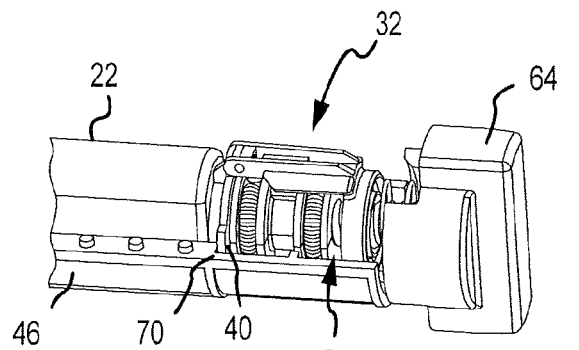
FIGS. 16A-16G is a series of perspective views sequentially showing a male clutch head being extended from a retracted position.
Figure 16B:
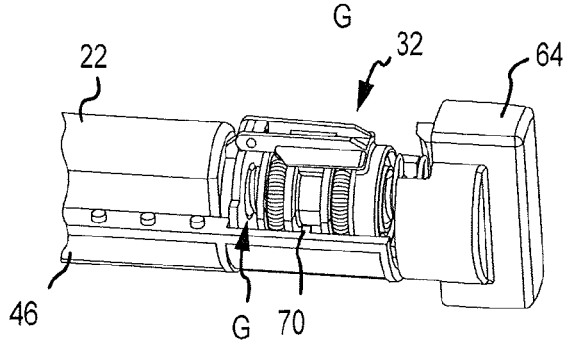

Operation of one embodiment of the motor mechanism 10 will now be described in reference to FIGS. 16A-16G. FIG. 16A shows a carriage assembly 32 and coupling or clutch head 64 in the retracted position as is also shown in FIG. 13A. In addition, the carriage assembly 32 is positioned at the end of the screw 18 closest to the electric motor 22. The flanges 40 of the spring snap holder 34 are in contact with the abutment surfaces 70 proximate the electric motor 22 and the left end surface 82 of the half nuts 14, 16 are in contact with the spring snap holder 34. A gap "G" is formed between the right end surface 84 of the half nuts 14, 16 and the annular member 48 of the nut translation follower 36. This position of the carriage assembly 32 and male clutch head 64 is also illustrated in FIGS. 6 and 9. When the electric motor 22 is initiated for purposes of moving the clutch head 64 into its extended or engaged position, the screw 18 will begin to rotate. Initially, the spring snap holder 34 and nut translation follower 36 remain stationary, but the half nuts 14, 16 begin to translate along the screw due to the interaction of the complementary threads 80 on the half nuts 14, 16 and threads 24 of the screw 18 and the interaction of the guide blocks 30 in the slots 54 of the guide members 52. The half nuts 14, 16 will move to the right as shown in FIG. 16B. As the half nuts 14, 16 move to the right along the screw 18, the outwardly extending flanges 40 move within the channel 42 formed between abutment members 70 and the guide blocks 30 move within the slots 54 formed by the opposed guide members 52.

As shown in FIGS. 7, 10 and 16B, the right end surface 84 of the half nuts 14, 16 then engage the annular member 48 of the nut translation follower 36. As illustrated, by comparing FIGS. 6 and 16A with FIGS. 7 and 16B, initially a gap G is formed between the left end surface 82 of the half nuts 14, 16 and the spring snap holder 34. Now the gap G is shown between the right end surfaces 84 of the half nuts 14, 16 and the annular member 48 of the nut translation follower 36. The split nut assembly 12 has moved within the space between the spring snap holder 34 and the nut translation follower 36.

Figure 16C:
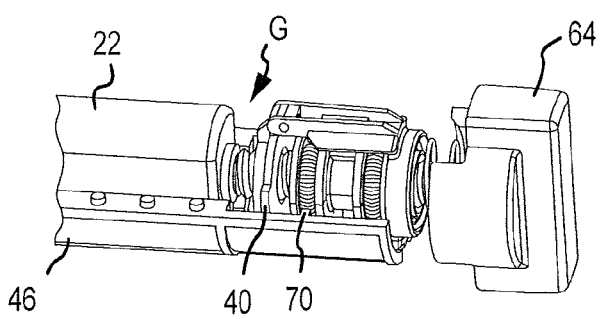

With reference to FIG. 16C, as the screw 18 continues to rotate, the half nuts 14, 16 push the translation nut follower 36 and spring snap holder 32. As a result, the entire carriage assembly 32 moves to the right and a gap G is formed between the flanges 40 on the spring snap holder 34 and the abutment members 70 proximate the electric motor 22.

Because the motor 22 initially is only required to move the split nuts 14, 16, instead of the entire carriage assembly 32, a smaller, less powerful motor 22 may be used. In addition, the motor 22 will achieve sufficient rotational space and momentum before the split nuts engage the translation nut follower 36 and, thus, a smaller motor will be able to move the entire carriage assembly 32. By reducing the mass that must initially be moved by the motor, savings in space and cost are obtained.

Figure 16D:
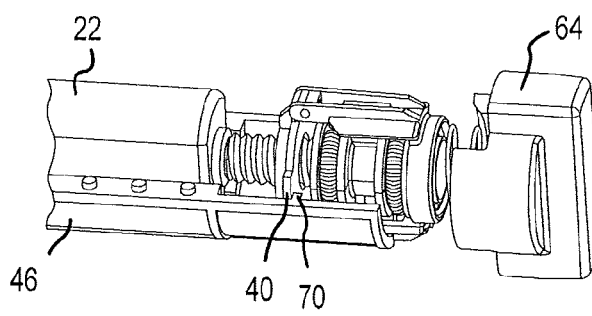
Figure 16E:
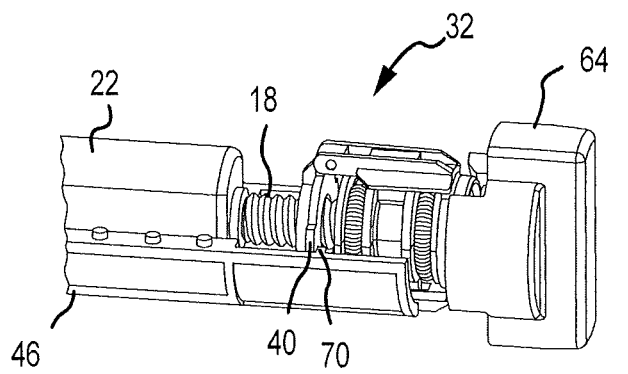

As the carriage assembly 32 moves to the right, the spring 62 will push the male clutch head 64 to the right toward engagement with the complementary slot 66 in the lever or DIN arm 68. If the slot 66 in the lever or DIN arm 68 (FIG. 15) is aligned with the male clutch head, further movement of the carriage assembly 32 to the right, as shown in FIG. 16D, will move the clutch head 64 further to the right and into engagement with the lever arm (not shown). If the clutch head 64 and slot 66 are not aligned, the spring 62 positioned between the clutch head 64 and the annular member 48 of the nut translation follower 36 will compress and store energy, as shown in FIG. 16E. When the lever arm 68 moves the slot 66 into alignment with the clutch head 64, the spring 62 will push the clutch head 64 into the slot 66, which is the position shown in FIG. 16D.

Figure 11A:
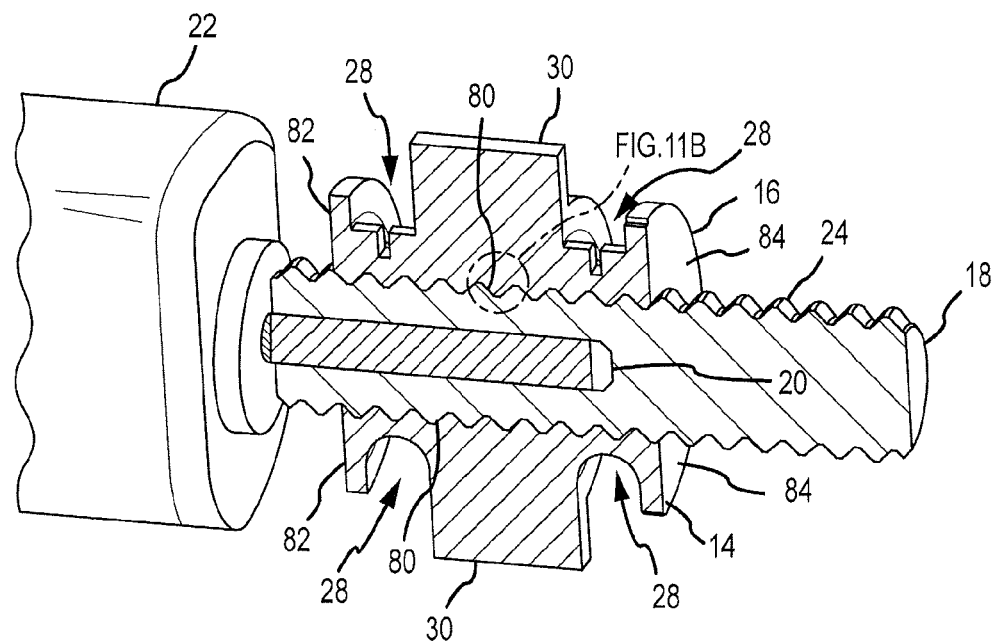
FIG. 11A is a partial cross-section view of one embodiment of a split nut threadably coupled to a threaded screw drive interconnected to an electric motor.
Figure 11B:
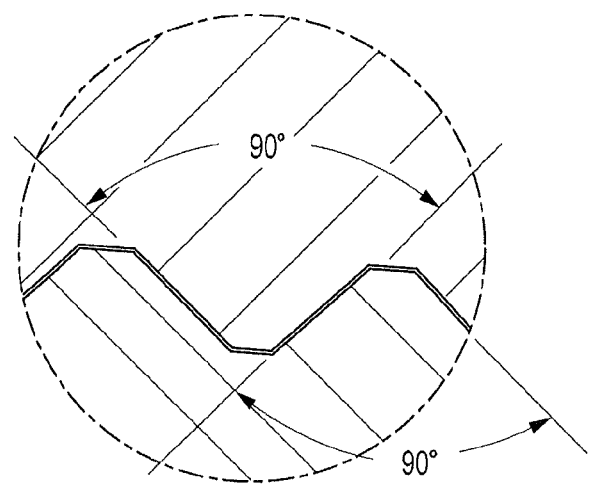
FIG. 11B is an enlarged view of the threaded coupling illustrated in FIG. 11A.
Figure 16F:
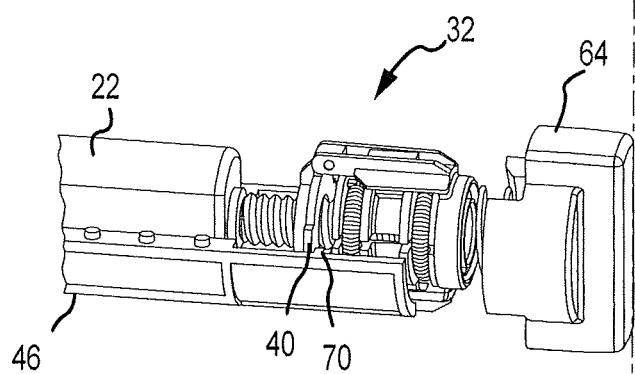
Figure 16G:
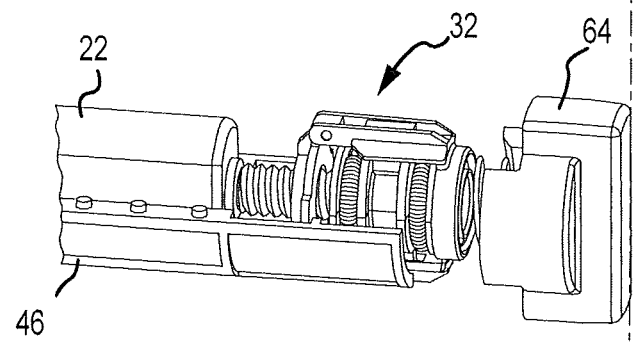
Figure 17A:
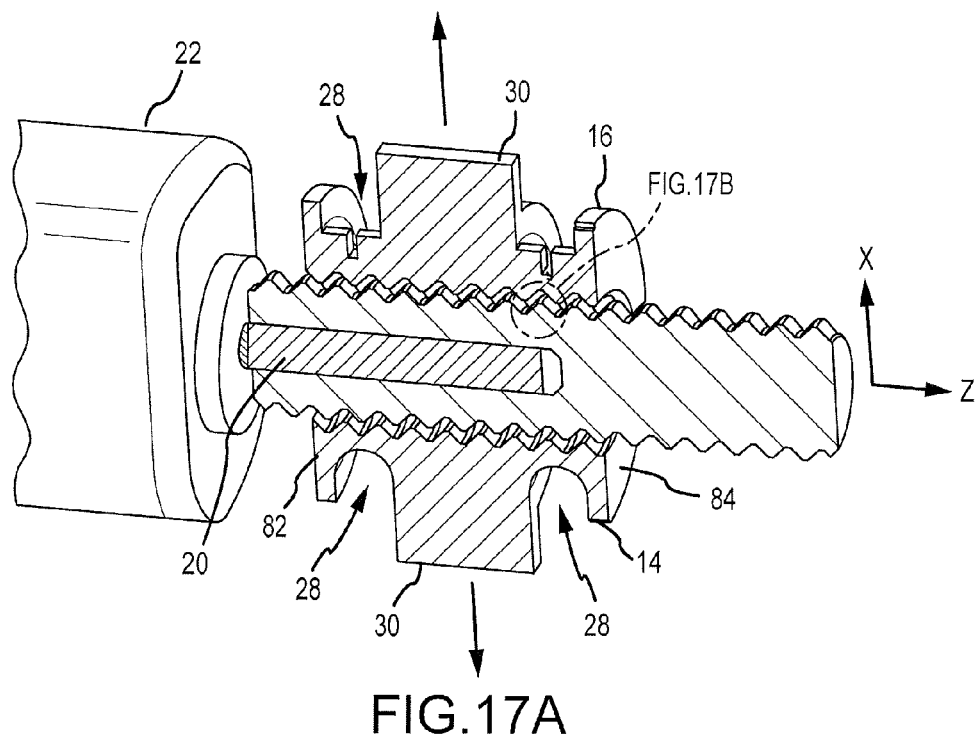
FIG. 17A is a partial cross-sectional view of one embodiment of a split nut decoupled from a threaded screw drive.
Figure 17B:
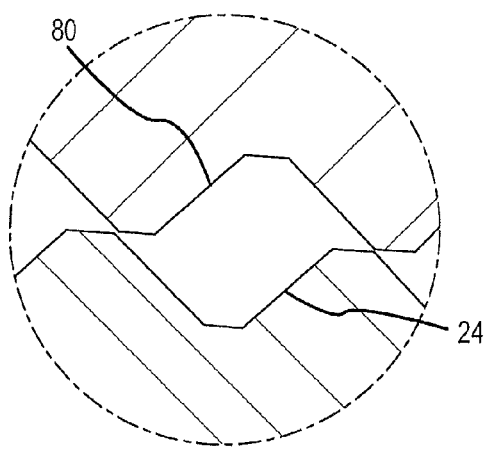
FIG. 17B is an enlarged view of the threaded decoupling illustrated in FIG. 17A.

As previously noted, abutment surfaces 70 are formed in the wall 44 of the housing 46 and cooperate with the flanges 40 formed on the spring snap holder 32 to create physical limits of travel for the carriage assembly. When the carriage assembly 32 reaches the abutment surfaces 70 that form the limit stop for the fully extended or engaged position, the carriage assembly 32 can proceed no further. However, the electric motor 22 may continue to rotate the screw 18. To prevent damage to the motor and to prevent creating stiction between the abutment surfaces 70 and the flanges 40, continued rotation of the screw will cause the half nuts 14, 16 to separate and move outwardly relative to the screw 18 to prevent the half nuts from applying a load force against the abutment surfaces 70 and the creation of any stiction between the surfaces of the flanges 40 and abutment surfaces 70. Referring to FIG. 17A, a frame of reference is set with the Z direction defining the direction of travel of the carriage assembly along the screw 18, and the X direction as the direction radially away from the screw. When the screw is still rotating the nut will move in the Z direction, left or right depending upon the direction of rotation. If the nut is prevented from moving in a Z direction, due to contact between the flanges 40 and the abutment surfaces 70, the threads 24 and 80 will push the half nuts radially out in the X direction as shown in FIGS. 16F, 17A and 17B. In a preferred embodiment the complementary threads 24 and 80 are formed at a 90° angle, although anything in the range of approximately 80° to 100° will work. The result of the 90° thread angle is that the force applied by the screw threads 24 will be generally equal on the half nuts 14, 16 in both the Z and X directions. With the elastomeric bands or springs 26 applying a limited radially inward force on the half nuts 14, 16, the half nuts will travel along the screw until prevented from doing so by abutment surfaces 70. (See, FIGS. 11A and 11B.) When the half nuts 14, 16 can travel no further along the screw, the force applied in the X direction by the threads overcomes the radially inward force of the bands 26 and the half nuts separate (FIGS. 16F, 17A and 17B) and then rejoin (FIG. 16G and FIGS. 11A and 11B). This action is repeated as long as the screw 18 continues to rotate in the same direction. This is in comparison to standard threads which are formed at about a 60° angle which is too small to force the half nuts to move sufficiently in the X direction for the threads to decouple and re-couple. In the embodiment shown, approximately 18 male thread tops on the screw 18 are simultaneously engaged with the corresponding 18 female thread tops on the split nuts. The split nut concept allows the motor mechanism to function without sensors to monitor and indicate the position of the carriage assembly 32, which also eliminates the need for related circuitry.

As shown in FIG. 16F, the carriage assembly has reached its physically limited position and the half nuts are separated due to continued rotation of the screw. In comparison, FIG. 16G shows the motor 22 stopped and the split nuts 14, 16 fully engaged with the screw due to the inward force applied by the elastomeric bands or springs 26.

Figure 18A:
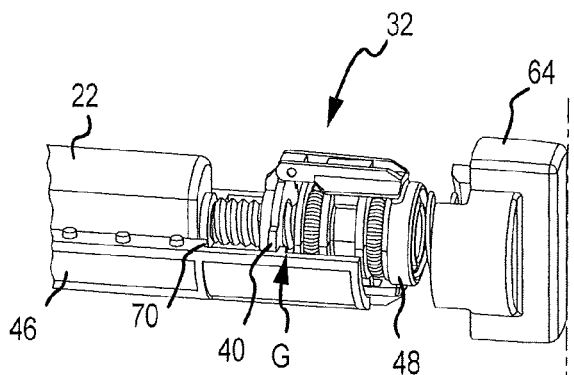
FIGS. 18A-18H is a series of perspective views sequentially showing retraction of a male clutch head from an extended position.
Figure 18B:
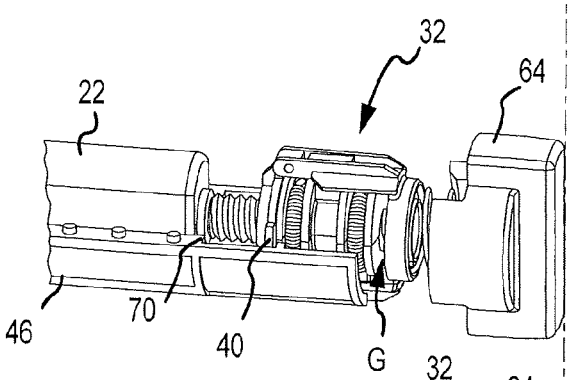
Figure 18C:
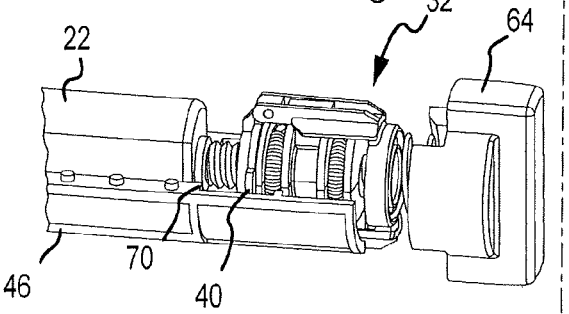
Figure 18D:
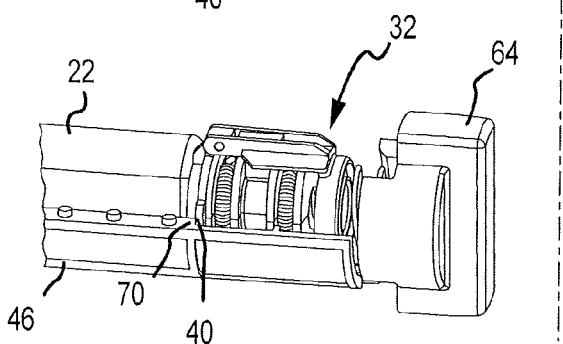
Figure 18E:
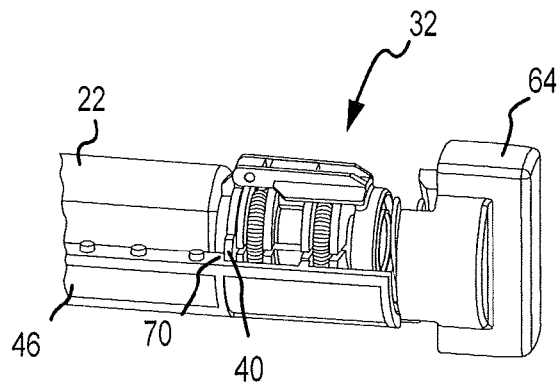
Figure 18F:
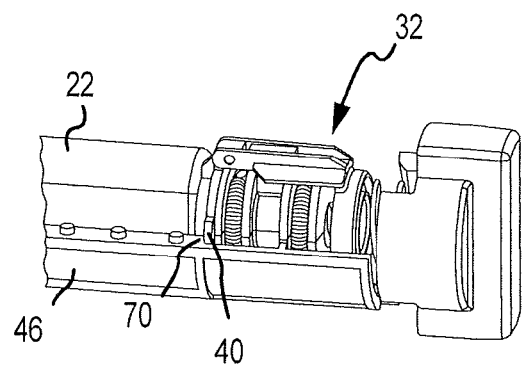

Retraction or disengagement of the male clutch head 64 from the slot 66 in the lever arm 68 will now be described. This sequence is illustrated in FIGS. 18A-18H. FIG. 18A is the same as FIG. 16D. With the coupling or clutch head 64 engaged with the complementary coupling member or lever arm 68, the electric motor 22 rotates in the opposite direction. Initially, the right end surface 84 of the half nuts 14, 16 are in contact with the annular member 48 of the nut translation follower 36. A gap G is formed between the left end surface 82 of the half nuts 14, 16 and the spring snap holder 34. Initial rotation of the screw 18 causes the half nuts 14, 16 to move within the interior of the carriage assembly 32. FIG. 18B shows the left end surface 82 of the half nuts 14, 16 now engaged with the spring snap holder 34 and a gap G formed between the half nuts 14, 16 and the annular member 48 of the nut translation follower 36. The clutch head 64 is still in the engaged position. Further rotation of the screw 18, as illustrated in FIG. 18C, causes the carriage assembly 32, spring 62 and clutch head 64 to move to the left creating a gap between the flanges 40 and the abutment surface 70 defining the fully extended position. FIG. 18D shows the carriage assembly 32, spring 62 and clutch head 64 in the fully retracted position. This position is also illustrated in FIG. 16A. In this position, the flanges 40 physically contact the abutment surfaces 70 proximate the electric motor 22. In this position, the male clutch head 64 has disengaged the lever arm 68. As shown in FIGS. 18E and 18F, if the motor continues to rotate, the half nuts 14, 16 will cyclically separate from and reengage with the threads of the screw 18 as a result of the interaction of the complementary threads 24 and 80 and the influence of the biasing members 26 until the screw 18 stops rotating. This prevents damage to the motor and the creation of stiction between any abutting surfaces.

Figure 18G:
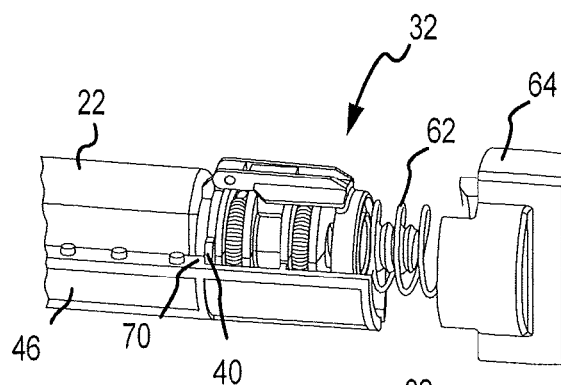
Figure 18H:
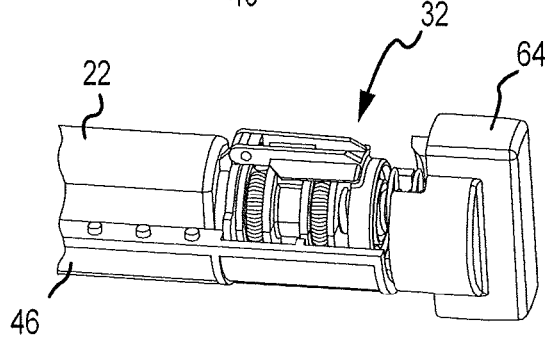

As shown in FIG. 18G, if the male clutch head 64 has not disengaged 62 from the lever arm 68 due to the relative orientation of the components because the lever arm 68 is in a rotated position relative to the clutch head 64 or due to friction between the components, for example, the spring member 62 will be extended as the carriage assembly 32 moves to its retracted position. Once the orientation of the lever arm 68 has changed to release the clutch head 64 or the friction has been overcome, the energy stored in the spring 62 will retract the clutch head 64 from the slot 66 in the lever arm 68 as illustrated in FIG. 18H.

In one embodiment, it takes about 30 milliseconds to move the carriage assembly 32 its full length of travel along the screw between abutment surfaces 70. Therefore, a current pulse to the motor greater than 30 milliseconds should be sufficient to accomplish full movement of the carriage assembly, regardless of its position. It will also be possible to give the motor a shorter pulse than 30 milliseconds because the motor, as it builds up revolutionary speed, it stores energy in the form of momentum or inertia. This energy can be used to move the carriage assembly 32 a further distance in the Z direction if current to the motor ends prior to the carriage assembly 32 reaching its desired position. Two or more pulses of less duration will also be possible to ensure that the system is in the correct position, i.e., closed or open, extended or retracted, engaged or disengaged. If a pulse is ongoing or if a further pulse is applied and the system is already at its physically limited position, the split nuts will separate and the motor will spin without significant restriction or damage until the current ceases flowing and the screw stops turning.

The present invention, in various embodiments, includes components, methods, processes, systems and/or apparatus substantially as depicted and described herein, including various embodiments, sub combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. The features of the embodiments of the invention may be combined in alternate embodiments other than those discussed above.

This method of disclosure is not to be interpreted as reflecting an intention that the claimed invention requires more features than are expressly recited in each claim. Rather, as the following claims reflect, inventive aspects lie in less than all features of foregoing disclosed embodiments. Thus, the following claims are hereby incorporated into this Detailed Description, with each claim standing on its own as a separate preferred embodiment of the invention.

Moreover, though the description of the invention has included description of one or more embodiments and certain variations and modifications, other variations, combinations, and modifications are within the scope of the invention, e.g., as may be within the skill and knowledge of those in the art, after understanding the present disclosure. For example, the motor mechanism may be used to move a blocking member into and out of a blocking position. The motor mechanism may also be used with lock assemblies on devices or objects other than doors. The motor mechanism may be used in other applications where controlled linear reciprocal motion is desired. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A motor mechanism comprising:
    a threaded member interconnected to a motor and rotatable in both a clockwise and counterclockwise direction;
    a split nut mounted on the threaded member, the split nut comprising at least two members, at least one of which has an inner threaded surface which complements the threads on the threaded member;
    at least one resilient member interconnected to the split nut and applying a force causing the threaded surface of the at least one member to engage the threads of the threaded member when the threaded member is rotating in the clockwise and when the threaded member is rotating in the counterclockwise direction;
    a first physical stop limiting movement of the split nut along the threaded member in one direction and a second physical stop limiting movement of the split nut along the threaded member in the opposite direction;
    wherein, when movement of the split nut along the threaded member is stopped while the threaded member continues to rotate in the clockwise direction, the inner threaded surface of the at least one member will disengage and reengage the threads of the threaded member, and when movement of the split nut along the threaded member is stopped while the threaded member continues to rotate in the counterclockwise direction, the inner threaded surface of the at least one member will disengage and reengage the threads of the threaded member.

2. The motor mechanism of claim 1, wherein the threads of the threaded member force the at least one member radially outwardly away from the threaded member and the at least one resilient member forces the at least one member to reengage the threads of the screw.

3. The motor mechanism of claim 2, wherein the angle of the threads of the threaded member and the inner threaded surface of the at least one member are between 80 and 100 degrees.

4. The motor mechanism of claim 1, further comprising means to prevent rotation of the split nut while the screw rotates.

5. The motor mechanism of claim 4, wherein the means to prevent rotation of the nut comprises at least one slot to receive and restrict movement of a guide member extending outwardly from the split nut.

6. The motor mechanism of claim 5, further comprising a first annular member positioned about the threaded member at one end of the split nut and a second annular member positioned about the threaded member at the opposite end of the split nut, the two annular members joined together in a spaced relationship with the split nut positioned in between the annular members.

7. An electromechanical lock comprising the motor mechanism of claim 1.

8. The motor mechanism of claim 1, wherein the at least two members comprising the split nut comprise up to four members, at least two of which have an inner threaded surface that engages the threads of the screw.

9. The motor mechanism of claim 1, wherein the at least two members comprise two half nuts, both of which have an inner threaded surface that engage the threads of the threaded member.

10. The motor mechanism of claim 1, wherein upon reversing the direction of rotation of the threaded member the at least one resilient member will cause the split nut to engage the threads of the threaded member and the split nut will move along the threaded member in the opposite direction from which the split nut was moving before the split nut was stopped.

11. A motor mechanism comprising:
a threaded member interconnected to a motor and rotatable in both a clockwise and counterclockwise direction;
a split nut mounted on the threaded member, the split nut comprising at least two members, at least one of which has an inner threaded surface which complements the threads on the threaded member;
at least one resilient member interconnected to the split nut and applying a force causing the threaded surface of the at least one member to engage the threads of the threaded member when the threaded member is rotating in the clockwise and when the threaded member is rotating in the counterclockwise direction;
wherein, when movement of the split nut along the threaded member is stopped while the threaded member continues to rotate in the clockwise direction, the inner threaded surface of the at least one member will disengage and reengage the threads of the threaded member, and when movement of the split nut along the threaded member is stopped while the threaded member continues to rotate in the counterclockwise direction, the inner threaded surface of the at least one member will disengage and reengage the threads of the threaded member.

12. The motor mechanism of claim 11, wherein the inner threaded surface of the at least one member will continue to disengage and reengage the threads of the threaded member while the split nut is stopped from moving along the threaded member and while the threaded member continues to rotate in the same direction the threaded member was rotating at the time the split nut stopped moving along the threaded member.

13. The motor mechanism of claim 11, further comprising a first physical stop limiting movement of the split nut along the threaded member in one direction and a second physical stop limiting movement of the split nut along the threaded member in the opposite direction.

14. The motor mechanism of claim 11, wherein upon reversing the direction of rotation of the threaded member the at least one resilient member will cause the split nut to engage the threads of the threaded member and the split nut will move along the threaded member in the opposite direction from which the split nut was moving before the split nut was stopped.

15. The motor mechanism of claim 11, wherein the threads of the threaded member force the at least one member radially outwardly away from the threaded member and the at least one resilient member forces the at least one member to reengage the threads of the screw.

16. The motor mechanism of claim 11, further comprising means to prevent rotation of the split nut while the screw rotates.

17. The motor mechanism of claim 11, wherein the angle of the threads of the threaded member and the inner threaded surface of the at least one member are between 80 and 100 degrees.

18. An electromechanical lock comprising the motor mechanism of claim 11.

19. The motor mechanism of claim 11, wherein the at least two members comprise two half nuts, both of which have an inner threaded surface that engage the threads of the threaded member.

* * * * *